(12) United States Patent
David

(10) Patent No.: US 7,966,223 B2
(45) Date of Patent: Jun. 21, 2011

(54) INTERACTIVE IMAGE ACTIVATION AND DISTRIBUTION SYSTEM AND ASSOCIATED METHODS

(76) Inventor: Clifford R. David, Windermere, FL (US)

(*) Notice: Subject to any disclaimer, the term of this patent is extended or adjusted under 35 U.S.C. 154(b) by 1079 days.

(21) Appl. No.: 11/691,583

(22) Filed: Mar. 27, 2007

(65) Prior Publication Data

US 2007/0188798 A1    Aug. 16, 2007

Related U.S. Application Data

(63) Continuation-in-part of application No. 11/279,642, filed on Apr. 13, 2006, now Pat. No. 7,881,968.

(51) Int. Cl.
*G06Q 30/00* (2006.01)

(52) U.S. Cl. ............... 705/26.1; 705/27.1; 705/14

(58) Field of Classification Search .......... 705/26.1, 705/27.1, 14
See application file for complete search history.

(56) References Cited

U.S. PATENT DOCUMENTS

| | | | |
|---|---|---|---|
| 5,448,320 A | 9/1995 | Sakai et al. | |
| 5,587,740 A | 12/1996 | Brennan | |
| 5,606,365 A | 2/1997 | Maurinus et al. | |
| 5,768,633 A | 6/1998 | Allen et al. | |
| 6,222,646 B1 | 4/2001 | Maurinus et al. | |
| 6,385,772 B1 | 5/2002 | Courtney | |
| 6,417,913 B2 | 7/2002 | Tanaka | |
| 6,532,345 B1 | 3/2003 | Gluck | |
| 6,542,824 B1 | 4/2003 | Berstis | |
| 6,545,708 B1 | 4/2003 | Tamayama et al. | |
| 6,591,068 B1 | 7/2003 | Dietz | |
| 6,628,899 B1 | 9/2003 | Kito | |
| 6,759,957 B2 | 7/2004 | Murakami et al. | |
| 6,774,936 B1 | 8/2004 | Park | |
| 6,856,346 B1 | 2/2005 | Kobayashi et al. | |
| 7,283,687 B2 * | 10/2007 | Bodin et al. | 382/305 |
| 2003/0023452 A1 | 1/2003 | Novais et al. | |
| 2003/0067543 A1 | 4/2003 | Okada et al. | |
| 2003/0086123 A1 | 5/2003 | Torrens-Burton | |
| 2004/0152486 A1 | 8/2004 | Sano | |
| 2004/0189816 A1 | 9/2004 | Nakazawa et al. | |
| 2004/0201683 A1 | 10/2004 | Murashita et al. | |
| 2004/0201709 A1 | 10/2004 | McIntyre et al. | |
| 2005/0091119 A1 | 4/2005 | Tuijn et al. | |
| 2005/0117018 A1 | 6/2005 | Wolf | |
| 2007/0003113 A1 * | 1/2007 | Goldberg | 382/118 |

OTHER PUBLICATIONS

Gilmore et al. Customer experience places: The new offering frontier, Strategy & Leadership, Chicago: 2002. vol. 30, Iss. 4; p. 4, downloaded from ProQuestDirect on the Internet on Feb. 27, 2011, 12 pages.*
Gilmore et al., Customer Experience Places: The New Offering Frontier; Strategy & Leadership. Chicago: 2002. vol. 30, Iss. 4; p. 4; Retrieved from ProQuestDirect on the Internet on Nov. 29, 2010, 12 pages.

* cited by examiner

*Primary Examiner* — James Zurita
(74) *Attorney, Agent, or Firm* — Jacqueline E. Hartt; GrayRobinson, P.A.

(57) ABSTRACT

A method for distributing a digital image of a customer includes receiving a request from a customer to a human representative (i.e., a "roving" photographer) for an image to be taken of the customer at a site. An image of the customer is captured by the "roving" photographer at the site in response to the received request. The image is transmitted to a remote processor. An electronic request is received from the customer to view the transmitted image, and the image is transmitted from the remote processor to the customer's communication device. If the customer decides to purchase the image, a transaction is finalized by receiving payment data from the customer, and the final image is provided to the customer. A commission is then paid to the photographer for the transaction. In another embodiment, the cost is at least partially subsidized by advertisement pushed to the customer's communication device.

12 Claims, 13 Drawing Sheets

INTERACTIVE IMAGE ACTIVATION AND DISTRIBUTION SYSTEM AND ASSOCIATED METHODS

CROSS-REFERENCE TO RELATED APPLICATION

This application is a continuation-in-part of application Ser. No. 11/279,642, filed Apr. 13, 2006, which itself claimed priority to provisional application Ser. No. 60/671,928, filed on Apr. 15, 2005.

FIELD OF INVENTION

The present invention generally relates to photographing systems and methods, and, in particular, to such systems and methods for ordering, activating, and distributing digital images to a customer.

BACKGROUND

The sale of photographs taken by a photographer of a customer of, for example, a theme park, cruise, or other event is known in the art. This system has inherent inefficiencies, in that the photographer typically prints many more photographs than are ultimately sold, and the sale is dependent upon the customer's viewing and agreeing to purchase the photograph displayed after the event.

An additional problem with known systems is that panoramic photographic images, which may comprise, for example, still or video images, are typically not possible when taken by a photographer close to the customer, nor images taken from a distance or height.

Further, a customer may desire a photograph to be taken at a time when a photographer is not in the vicinity.

Another particular difficulty with photography in general is that there is no really viable system available wherein the photographer him/herself can be in the picture. Personal camera equipment is typically not sufficiently sophisticated to produce a good product, and extra equipment, such as tripods, must be hauled along to accomplish self-photos. In the realm of videography, there is no known way to film oneself wherein the camera moves. Further, the skill of the individual is typically lacking, and good amateur photographs are rare.

An additional difficulty at present is that there is no known way to photograph a person at a location and distribute to a plurality of other people simultaneously and contemporaneously.

Therefore, it would be desirable to provide systems and methods for more efficiently capturing and delivering photographic and/or video images to a customer on demand, with the capability of remote ordering and payment, in some embodiments upon viewing a preview of the image with the use of a personal communication device. It would also be desirable to provide systems and methods wherein the customer him/herself can be a subject of the image. It would be additionally desirable to provide systems and methods for distributing images simultaneously and contemporaneously to a plurality of persons other than the image subject as well as to the image subject him/herself.

SUMMARY OF THE INVENTION

The present invention in one aspect is directed to a method for distributing a digital image of a customer. The method comprises the step of receiving a request from a customer for an image to be taken of the customer at a site. The request can be received, for example, via a remote signal from a customer's communication device. Payment data are obtained from the customer, and a location of the site is determined.

The request is relayed to a remote imaging device that is positioned to image the customer at the site. An image is automatically captured of the customer at the site, and the image is relayed as a proof image to the customer's communication device. Finally, if the image is desired by the customer, an approval is received from the customer to purchase the image.

In another aspect of the invention, a method for distributing a digital image of a customer comprises the step of relaying a request from a customer to a human representative for an image to be taken of the customer at a site. Payment data are obtained from the customer, and a location of the site is determined. A command is received at a remote imaging device to image the customer at the site, and an image is automatically captured of customer at the site.

A further aspect of the invention is directed to a system for distributing a digital image of a customer. In this embodiment the system comprises a customer data receiver for receiving a request from a customer for an image to be taken of the customer at a site. The request is receivable via a signal from a customer's communication device. The receiver is also provided for obtaining payment data from the customer.

Means are provided for determining a location of the site. A remote imaging device is positioned to image the customer at the site and includes a receiver. A transmitter is in signal communication with the customer data receiver, the location determining means, and the remote imaging device receiver. The transmitter is useful for relaying the request to the remote imaging device and for signaling the remote imaging device to automatically capture an image of the customer at the site.

An image transmitter is in signal communication with the remote imaging device and is adapted to relay the image as a proof image to the customer's communication device. The customer data receiver is further adapted to receive an approval from the customer to purchase the image.

Another aspect of the present invention is directed to a system for distributing a digital image of a customer. The system comprises a representative communication device for receiving a request from a customer for an image to be taken of the customer at a site. The request is receivable via a signal from a customer communication device to a human representative. The representative communication device is also useful for obtaining payment data from the customer.

Means are provided for determining a location of the site. A remote imaging device is positioned to image the customer at the site and includes a receiver. A transmitter is in signal communication with the representative communication device, the location determining means, and the remote imaging device receiver. The transmitter is useful for relaying the request to the remote imaging device and for signaling the remote imaging device to automatically capture an image of the customer at the site.

Another aspect of the invention is directed to a method for distributing a digital image of a customer. This embodiment comprises the step of receiving a request from a customer to a human representative (i.e., a "roving" photographer) for an image to be taken of the customer at a site. An image of the customer is captured by the "roving" photographer at the site in response to the received request. The image is transmitted to a remote processor. An electronic request is received from the customer to view the transmitted image, and the image is transmitted from the remote processor to the customer's communication device.

If the customer decides to purchase the image, a transaction is finalized by receiving payment data from the customer, and the final image is provided to the customer. A commission is then paid to the photographer for the transaction.

In another sub-embodiment of this method, the transaction is at least partially subsidized by an advertisement that is sent to the customer's communication device.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENT

A description of the preferred embodiments of the present invention will now be presented with reference to FIGS. 1A-12.

Figure 1A:
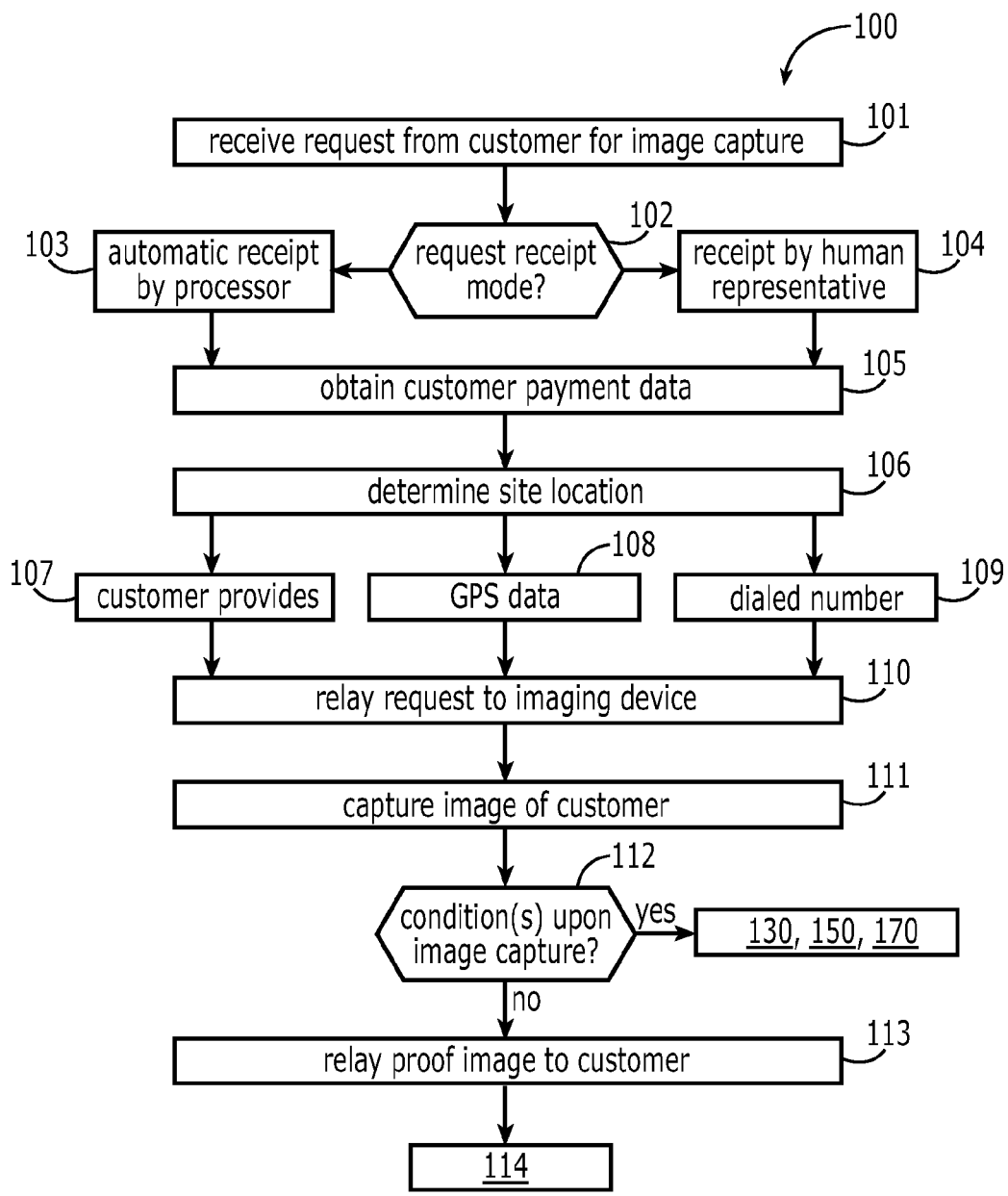
FIGS. 1A-1B is a flowchart of exemplary methods of the present invention for providing an image to a customer.
Figure 1B:
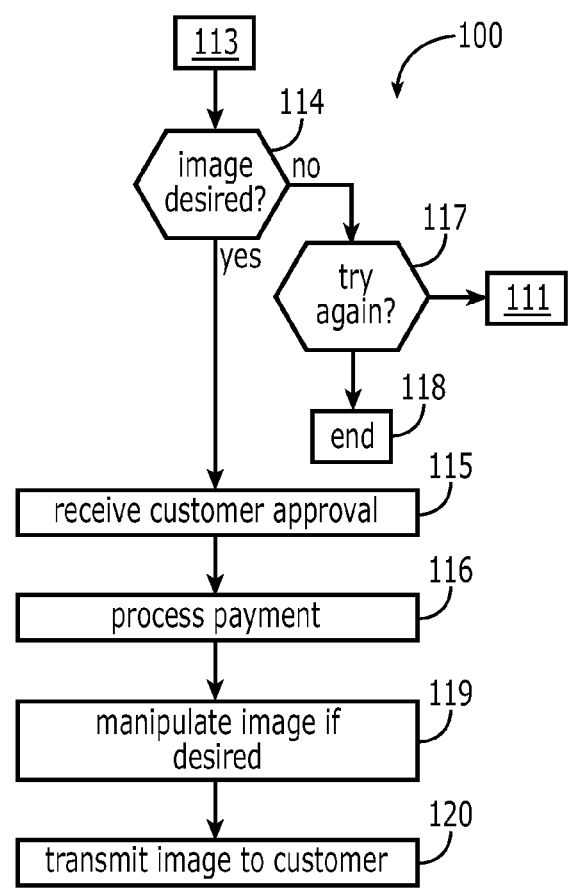
Figure 2:
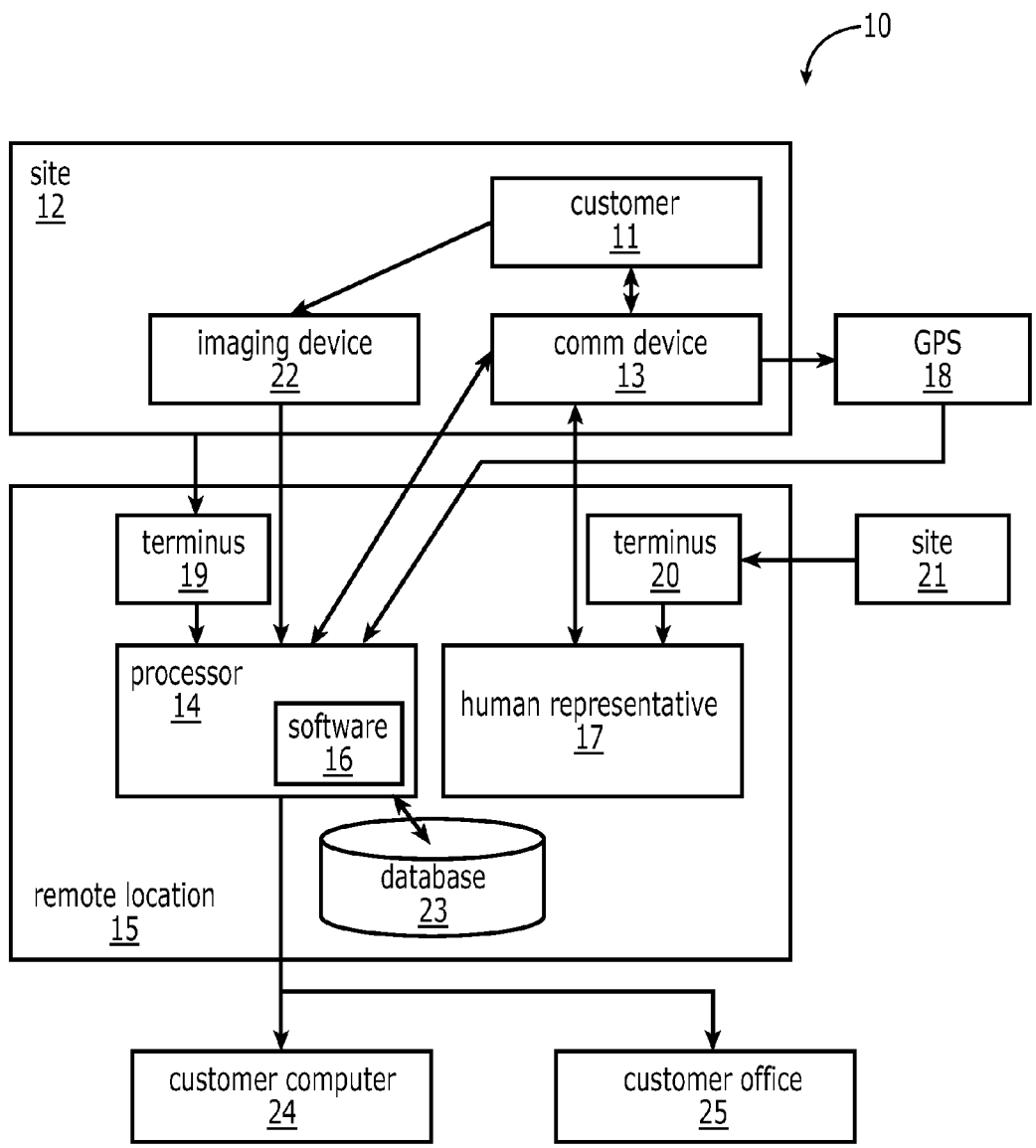
FIG. 2 is a system schematic of the embodiment of FIG. 1
Figure 3:
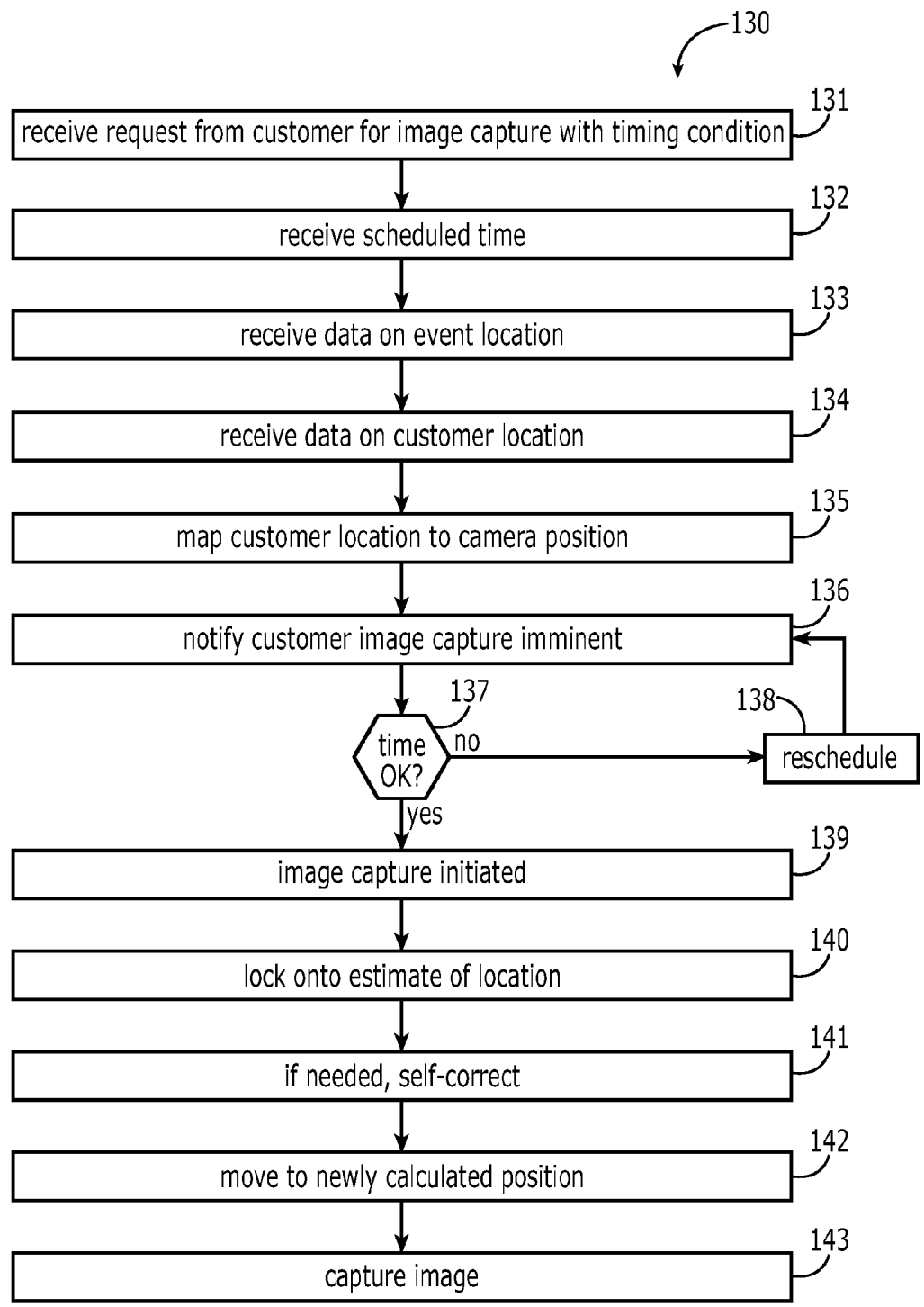
FIG. 3 is a flowchart for an embodiment of the invention for use at a stadium.
Figure 4:
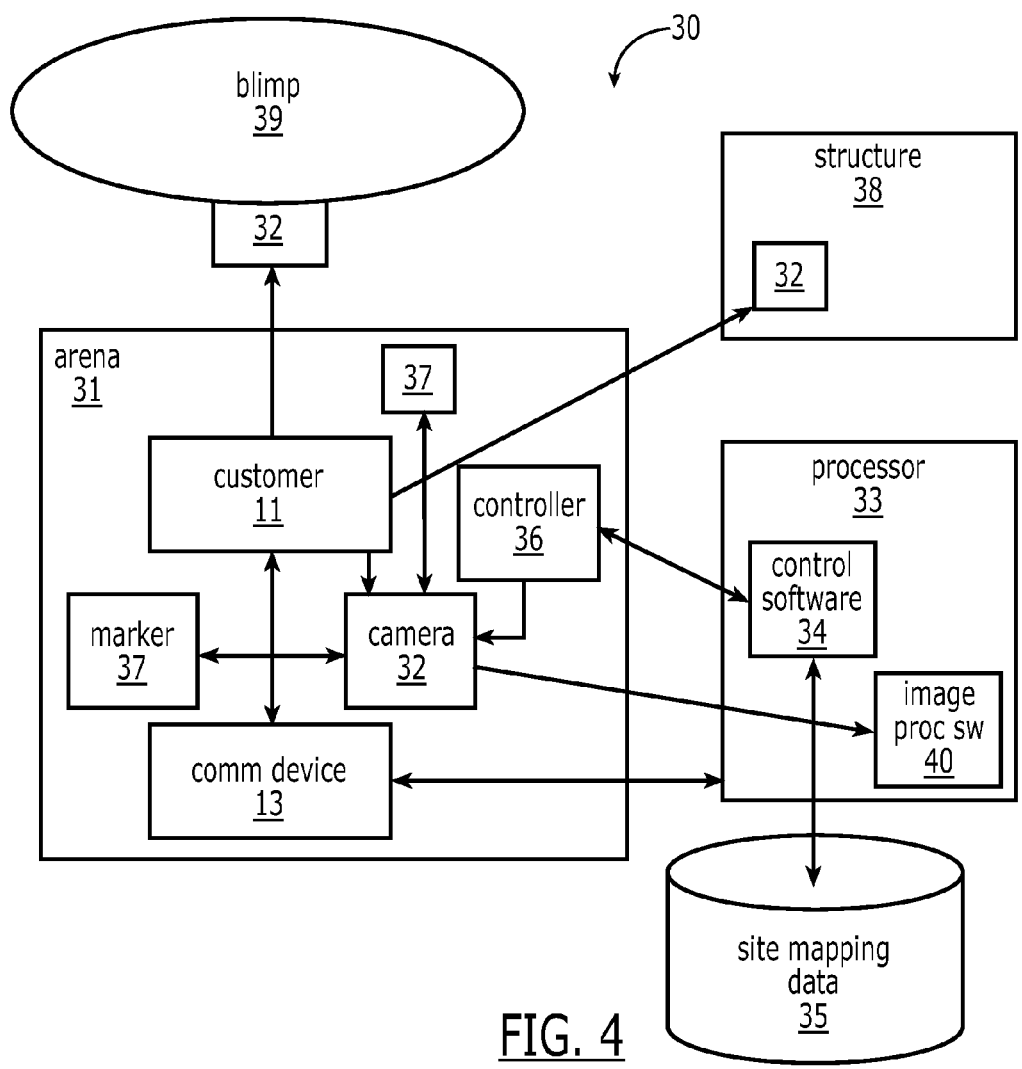
FIG. 4 is a system schematic of the method of FIG. 3.
Figure 5:
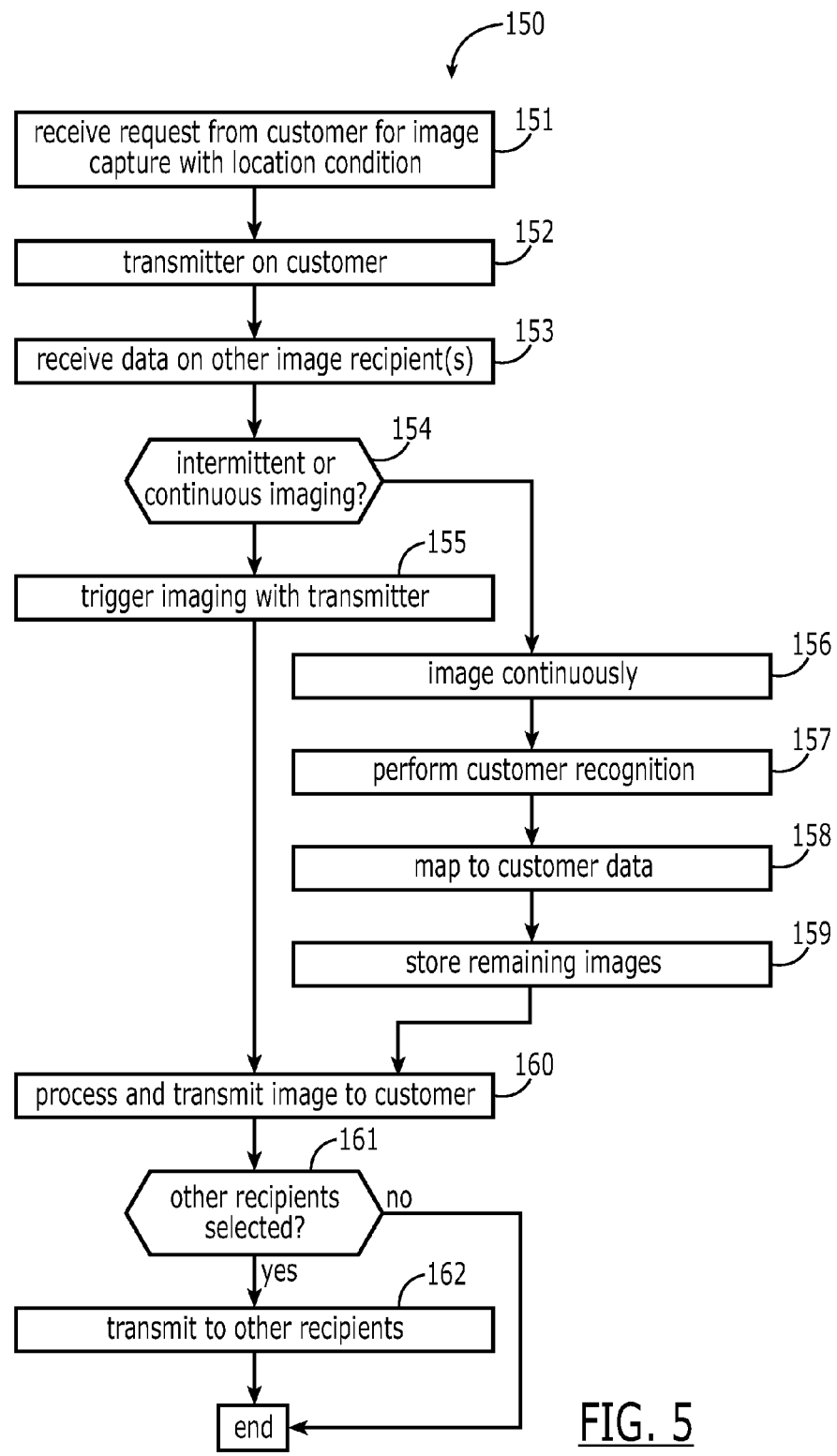
FIG. 5 is a flowchart for an embodiment of the invention for use when the customer is in motion.
Figure 6:
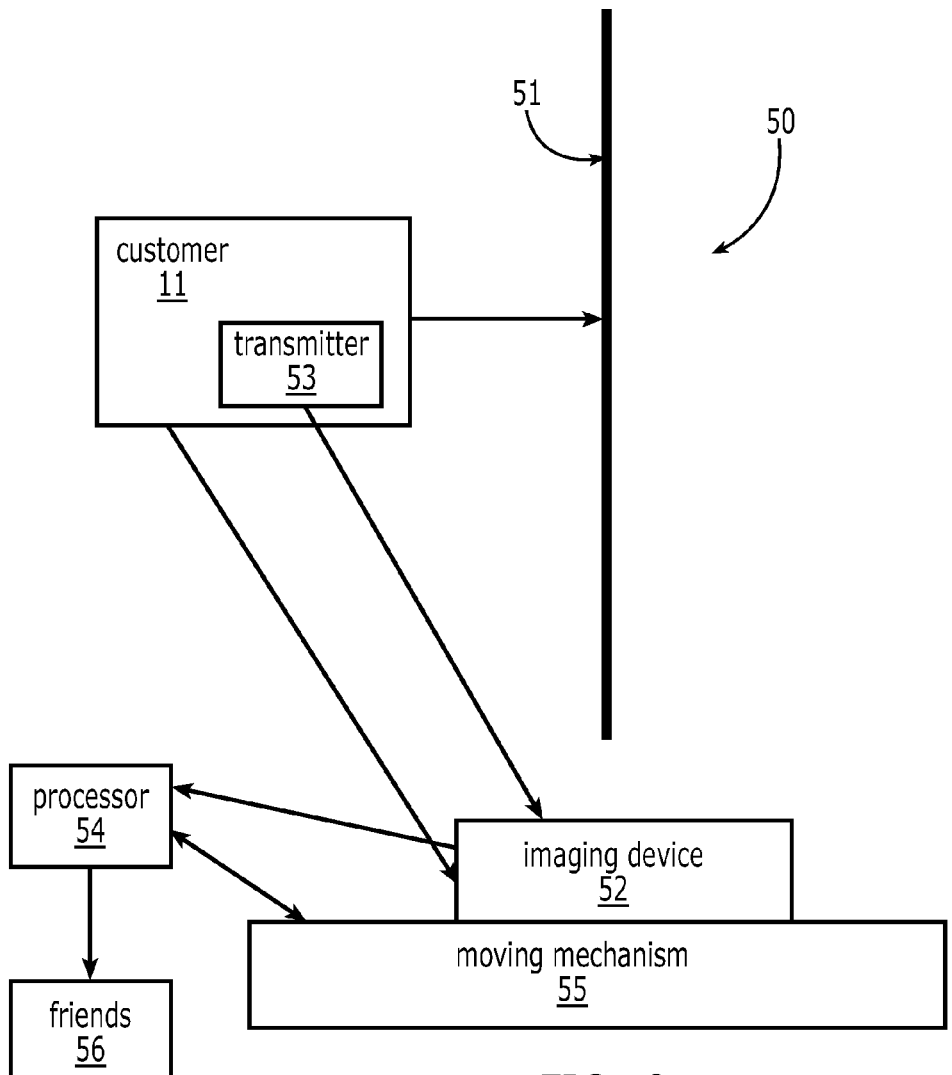
FIG. 6 is a system schematic of the method of FIG. 5.
Figure 7:
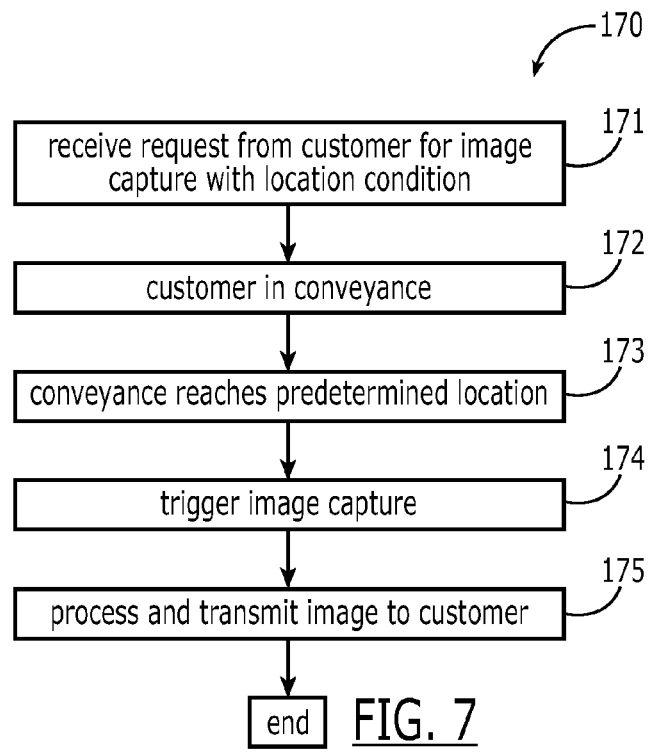
FIG. 7 is a flowchart for an embodiment of the invention for use when the customer is in a conveyance.
Figure 8:
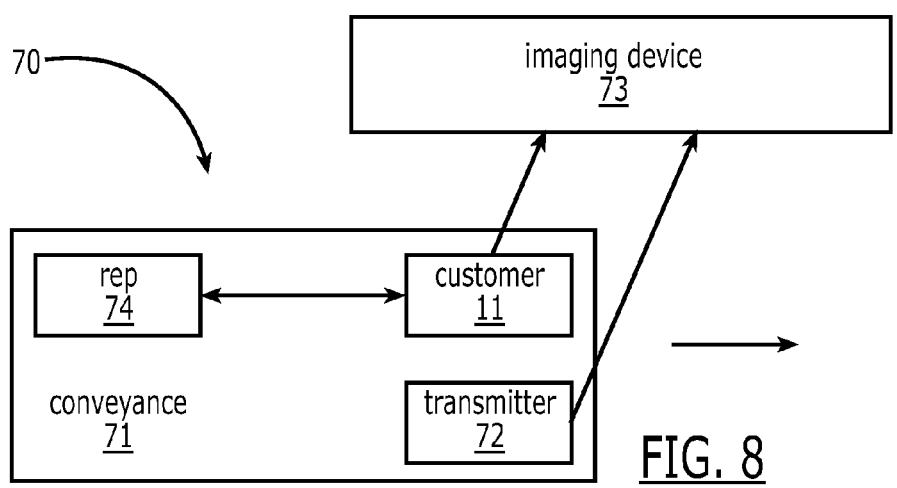
FIG. 8 is a system schematic of the method of FIG. 7.
Figure 9:
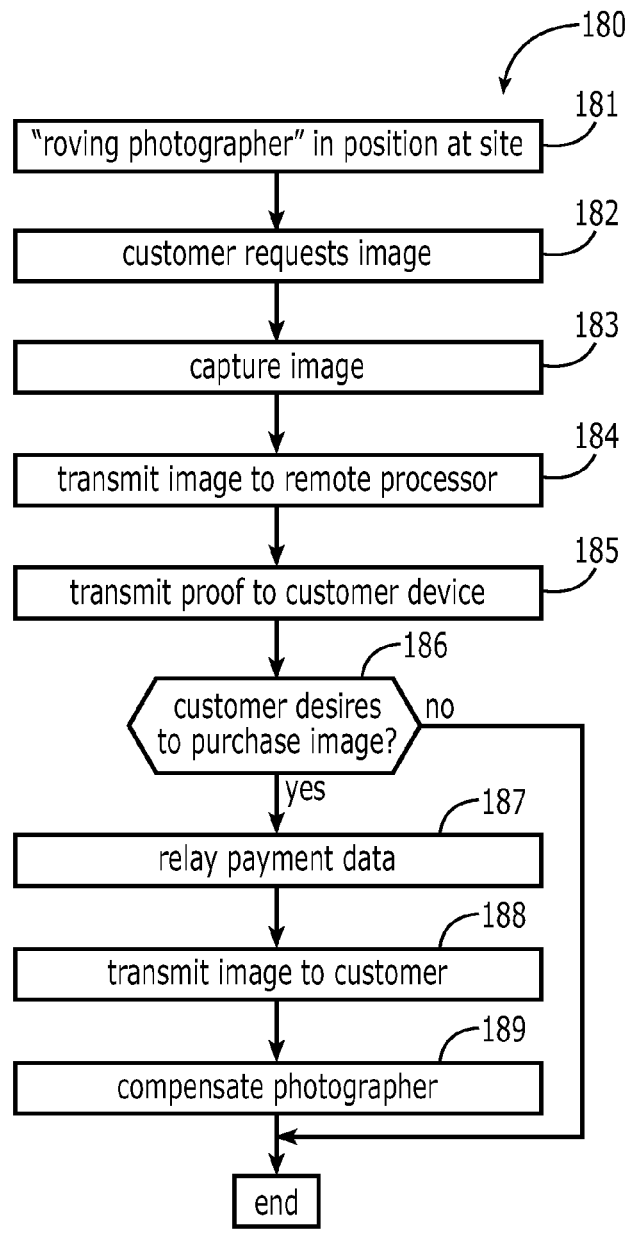
FIG. 9 is a flowchart for an embodiment of the invention for use with a "roving" photographer.
Figure 10:
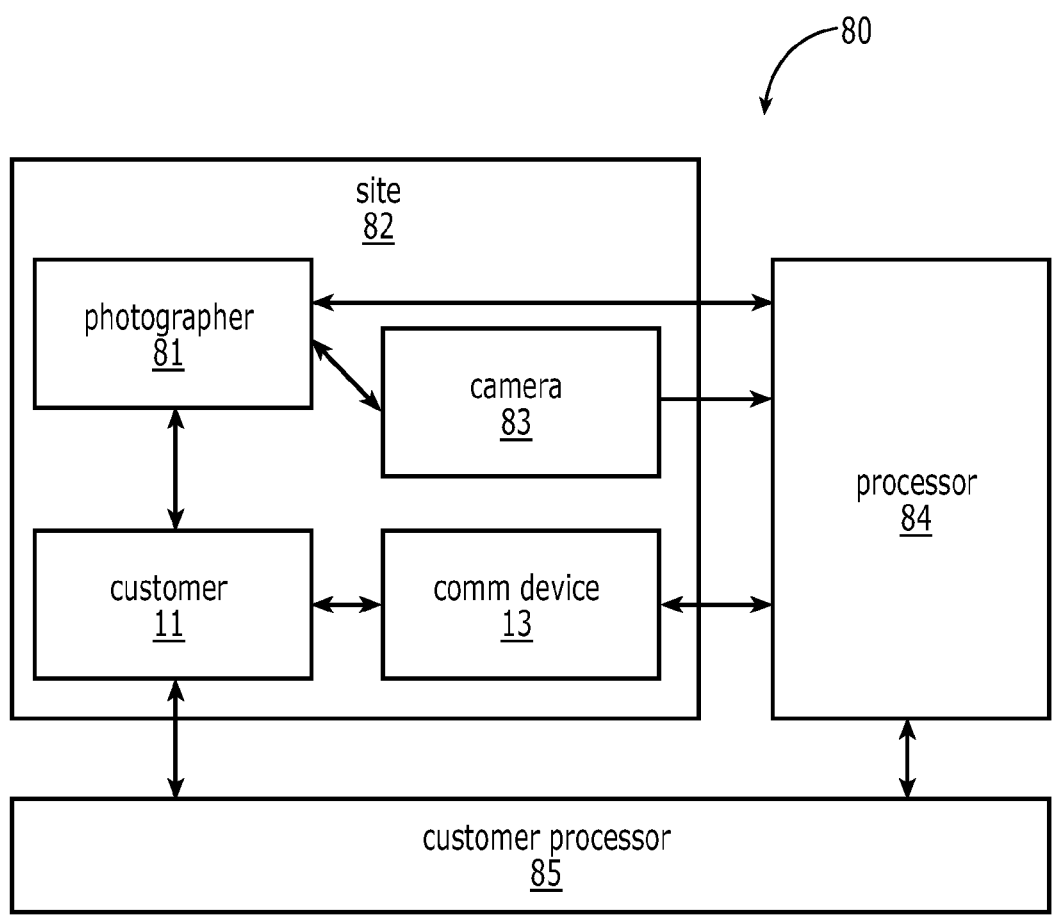
FIG. 10 is a system schematic for the method of FIG. 9.

The present invention in one aspect is directed to a system 10 and method 100 for distributing a digital image of a customer(FIGS. 1A-1B and 2). The method 100 comprises the step of receiving a request from a customer 11 for an image to be taken of the customer at a site 12 (block 101). The request can be received, for example, via a remote signal from a customer's communication device 13, for example, a cellular telephone, computer, or personal data assistant. Two exemplary embodiments are centered about the mode of receiving the request from the customer 11 (block 102). In one embodiment, the request is received and processed automatically with the use of a processor 14 at a remote location 15 and mediated by software 16 for carrying out the processor method steps (block 103). In this embodiment, the data can be transmitted from the customer 11 using the communication device 13 in ways known in the art, such as, but not intended to be limited to, voice recognition, keystroke entry, or tablet handwriting recognition.

Another mode of receiving the request comprises establishing a human representative 17 at the remote location 15. In this mode, the customer's request is received by the human representative 17 for an image to be taken of the customer 11 at a site 12 (block 104).

In either data-receipt mode, payment data are obtained from the customer (block 105), and a location of the site is determined (block 106).

There is a plurality of methods of determining the location of the site, as will be appreciated by one of skill in the art. For example, the site location determining step can be accomplished by directly receiving information on the site location from the customer (block 107), such as by asking for an oral or keypad indicator of location. In a theme park, for example, various "photo-rich" sites could be established and labeled as such, with indicia adjacent the site indicative of the site location. In a non-contained environment, such as a city, a printed or recorded travel guide could be provided to the customer prior to arrival with sights to see, each having an identifier associated therewith ("If you are at the Eiffel Tower, press 506."). The travel guide could, for example, be provided over the Internet, and could include pictures of the sights and the associated photo-rich sites to enable the customer to find them easily. Such a travel guide could be provided at a contained environment as well, such as at entry. Obtaining the travel guide could be interactive, with selections enabled to tailor for customer interests (e.g., museums, panoramic views, animals, etc.). The travel guide could also be provided on site via the customer's communication device, which could operate similar to such devices as known for use at museums, wherein a depressing of a number on the device's keypad can produce a lecture on the site being visited ("For information on the Eiffel Tower, please press 507.").

Another method of site location determination comprises electronically determining the site location from position data automatically ascertained from the customer's communication device 13 (block 108). This method can be accomplished, for example, using global positioning system 18 data obtained from a position of the communication device 13. Similarly, a site may have located therein a sending device that, when initiated from a receiver that is ready for this purpose, a message is sent to the customer's communication device 13 that they are in a location equipped with an imaging device 22 and that a photo opportunity is available.

Yet a further method of site location determination is accomplished with the use of a characteristic of the remote signal (block 109). One method of accomplishing this can be wherein the remote signal comprises an electronic contact initiated to one of a plurality of termini 19,20, the particular terminus contacted determinative of the site location. Thus a unitary processor 14 could be used to receive requests from a plurality of site locations 12,21, with a different telephone number provided for each site location 12,21, the dialed number data determinative of the particular site location 12 at which the customer 11 is currently positioned.

In either request mode, the request is relayed to a remote imaging device 22 that is positioned to image the customer 11 at the site 12 (block 110). The imaging device 22, which may comprise, for example, a digital still or video camera, can be affixed, for example, in positions from which it would be difficult for the customer 11 to obtain an image him/herself, with or without other members of a group, such as from a great height or to provide a wide view.

An image is automatically captured of the customer 11 at the site 12 (block 111). This automatic capturing can be subject to certain predetermined conditions (block 112), as will be expanded upon further in the following, or can be substantially instantaneous, which is the case to be considered at present. Under "substantially instantaneous" is intended to be subsumed the possibility that the customer 11 could order an image from his/her communication device 13, and a "countdown" is issued over the communication device 13 so that the customer 11 can be adequately prepared in position for the image to be taken.

In one embodiment, the image can relayed as a proof image to the customer's communication device 13 or to another viewing device such as known in the art (block 113). Preferably this image will be of low resolution or having some marking or defect purposely imposed thereon to prevent the customer 13 from merely taking this image without making payment, and may have a feature of vanishing after a predetermined time. The proof image may also comprise a "preview" image that is captured prior to final image capture. If the image is desired by the customer (block 114), an approval is received from the customer 11 to purchase the image (block 115), and payment is processed (block 116). If the customer 11 declines to purchase the image (block 114), another attempt may be made to capture an image (block 117), or the method may end (block 118).

As will be understood by one of skill in the art, the term "image" can include multiple forms, such as a digital still photograph or a video, and multiple imaging devices of multiple types and number can be situated at a particular location. The customer 11 can decide, upon agreeing to purchase the image (block 115), to include other features in the image, for example, but not intended to be limited to, a manipulated image (block 119) that can comprise an enhanced image, such as achieved by editing the image to improve quality or adding indicia to the image. Further, a still image may comprise a plurality of images, and the customer may elect to purchase a collection of the plurality images as, for example, in a photo album. Additionally, the images may also include previously captured images of the site that are stored in the system and are not customer-specific, but may include, for example, panoramic views of a building or scenery, or views at different times of the day or season. Verbiage such as a travelog may be added to such an album, gleaned from the locations that have been visited by the customer. Such manipulation and creation can be carried out under control of the processor 14 and software 15, with previously stored verbiage and images accessible in a database 23 accessible by the processor 14.

In the case of a video, the manipulation can take the form of adding audio and video data to the video, which could include previously created audio and video data relating to the site location or audio data transmitted by the customer 11, for example, via the communication device 13. As with the photo album discussed above, an entire record of a trip or portions thereof can be created from a combination of customer-specific video and audio sections and prerecorded video and audio material to result in a professional-quality "movie," starring the customer. The audio provided by the customer can be, for example, a combination of ad libbed material and pre-written "script" material provided by the system purveyor.

Whatever form the final image takes, upon completion, the purchased item is transmitted or made accessible to the customer 11 (block 120). Exemplary forms include, but are not intended to be limited to, a hard copy (printed photograph, video, DVD, etc.) that can be sent to a predetermined location, a digital image can be electronically routed to a predetermined electronic address such as a computer 24 at the customer's residence or office 25, and an electronic address can be provided for securing a digital image therefrom, for example, web-site accessibility for download to a device such as a personal media device, telephone or other viewing device.

As mentioned above, in certain embodiments of the method 130, conditions can be put on the image capturing process when the customer 11 places an order (block 131). Some conditions may concern timing, so that the image is scheduled to be taken at a time stipulated in the timing condition (block 132), as in the embodiment depicted in FIGS. 3 and 4. Here the system 30 is installed for use in an enclosed, subdivided space such as a sports arena 31. In some ordering situations, if the customer uses a communication device 13 that is known to the system 30, and is identifiable via, for example, a caller ID-type function, the customer's previously stored data can be accessed. Such previously stored data may include such items as name, billing information, and season ticket data for correlating with a likelihood that the customer is attending a particular arena event, and for accessing location information.

The system 30 comprises an imaging device 32 that is in signal communication with a processor 33, which may be situated at the arena 31 or remote therefrom. For example, the imaging device 32 could be situated off-site from the event, such as on a structure 38 outside the arena property or in the air on a blimp 39. The processor 33 has resident thereon control software 34, and site mapping data 35 are accessible by the software 34. The imaging device 32 is mounted so as to be movable responsive to the control software 34 to enable imaging the customer at a particular sub-area of the site 31.

In practice, once the customer 11 has placed an order (block 131) for an image to be captured, with additional data provided as to a particular event (time/place; block 133), the customer's exact location is requested, for example, as indicated by a seat number in the arena 31 (block 134). The seat location is then mapped by the software 34 to control parameters for the imaging device 32 (block 135), and, at the predetermined time, the customer 11 can be notified, such as via the communication device 13, that an image is about to be captured (block 136). If the present time is not acceptable (block 137), the capture can be rescheduled (block 138); otherwise, the confirmation results in the image capture process being initiated (block 139).

As part of the image capture process is included a feature for ensuring that the imaging device 32 be aimed correctly. As will be understood by one of skill in the art, whatever mechanism 36 is used to point the imaging device 32, there is likely to be inherent drift and resulting inaccuracies in positioning. In order to correct for such imprecision, preferably the system 30 further comprises a marking standard 37, and preferably a plurality of marking standards 37, positioned around the arena 31. Using techniques known in the art of image processing, software 40 resident on the processor 33 first locks in on the marking standard 37 believed to be closest to the customer 11 (block 140) and performs a self-correction algorithm to inform the mapping and control software 34 (block 141). The imaging device 32 is then moved under control of the control software 34 to the newly calculated position (block 142), and the image is captured (block 143). The remaining processing and transmitting steps can be substantially as discussed above.

In another embodiment 50,150 (FIGS. 5 and 6), the condition comprises a customer positioning condition. For example, the customer 11 could request (block 151) that the image be taken when the customer 11 reaches a particular location. In an example of an athletic event, the customer 11 could be competing in a foot race having a finish line 51. The imaging device 52 could be positioned so as to capture the customer's image upon crossing the finish line. In a particular embodiment, the customer 11 could be wearing or carrying a transmitter 53 (block 152) such as known in the art. The customer 11 may also elect other persons 56 to whom to send the image (block 153).

In order to make the process automatic and customer-specific, intermittent and continuous embodiments are provided (block 154). For the intermittent embodiment, the transmitter 53 is used to trigger the imaging device 52 when the finish line 51 is crossed (block 155). A similar process obtains for video, wherein a predetermined length of video could be triggered to be captured upon receipt of the customer's signal, and could, in some embodiments, "lock on" to the customer in motion, wherein the imaging device 52 is automatically movable under processor 54 control via a moving mechanism 55. Other modes of recognizing the customer 11 may also be contemplated by one of skill in the art, such as, but not intended to be limited to, biometric means, such as facial recognition.

For the continuous embodiment (block 154), the imaging device 52 is operating substantially continuously between two predetermined times (block 156), for example, in the case of a foot race, from a time prior to a shortest possible completion time to after a predetermined longest completion time. In this case, either after or during the event, customer recognition is performed (block 157) upon reaching the predetermined position (e.g., the finish line 51), and the image containing the customer 11 is mapped to the previously obtained customer data (block 158). Remaining images are stored (block 159) in the event that, after the event, even those who have not pre-ordered could provide their data and obtain an image later.

The remaining processing and transmitting steps can be substantially as discussed above (block 160). In addition, if an option has been exercised to send the image to friends (block 161), the image can be transmitted to them 56 as well (block 162), thereby adding not only wide and automatic distribution potential, but also eliciting an immediacy to the transmission, since it can be substantially simultaneous with the event and contemporaneous with the transmission to the entire distribution group. The customer 11 can also be contacted within a predetermined time after the event and have the image displayed on the communication device 13 automatically, such as 15 minutes after completing a marathon. Manipulation of the image can be automatically performed suitable to the event as well, such as merging the image with a pre-recorded background or video clip (e.g., a sports-related commercial, cheering crowds, etc.) This embodiment could be useful for many types of situations, such as, but not intended to be limited to, during skiing, rafting, or any other outdoor or indoor activity.

In yet another embodiment 70,170 (FIGS. 7 and 8), similar in some ways to the preceding one, the customer 11 can request that an image be captured (block 171) while positioned in a conveyance 71, for example, an amusement ride or a carriage (block 172). The image capturing step could be, as above, intermittent or continuous. In the intermittent case, the image capturing can be triggered by a transmitter 72 that in this embodiment can be affixed to the conveyance 71 so that, when the conveyance 71 has reached a particular location (block 173), an imaging device 73 is triggered to capture the image (block 174). In this embodiment, the requesting step could be performed, for example, through a human representative 74 such as a leader or conveyance driver, who could earn a commission for each image sold. The continuous embodiment could operate as above, with, again, a commission paid to the human representative 74 for each image sold.

The resulting image could be made available on-site or subsequently, and processed and transmitted as above (block 175).

In a further embodiment 80,180 (FIGS. 9 and 10), a "roving photographer" 81 is present at a site 82 visited by the customer 11 (block 181). In this embodiment of the method 180, a request is received from the customer 11 by the photographer 81 for an image to be taken of the customer 11 at the site 82 (block 182). The image is captured 83 (block 183) and transmitted to a remote processor 84 (block 184). A proof image of the image is transmitted from the remote processor 84 to the customer's communication device 13 (block 185), which can occur substantially contemporaneously with the image-capturing step at the site 82.

If the customer 11 decides to purchase the image (block 186), the transaction is finalized by relaying payment data from the customer 11 to the remote processor 84 (block 187), and a final image is transmitted image to the customer 11 (block 188), such as over a network (e.g., the Internet) to a customer processor 85. In this scheme, the photographer 81 receives compensation for the transaction (block 189).

Figure 11A:
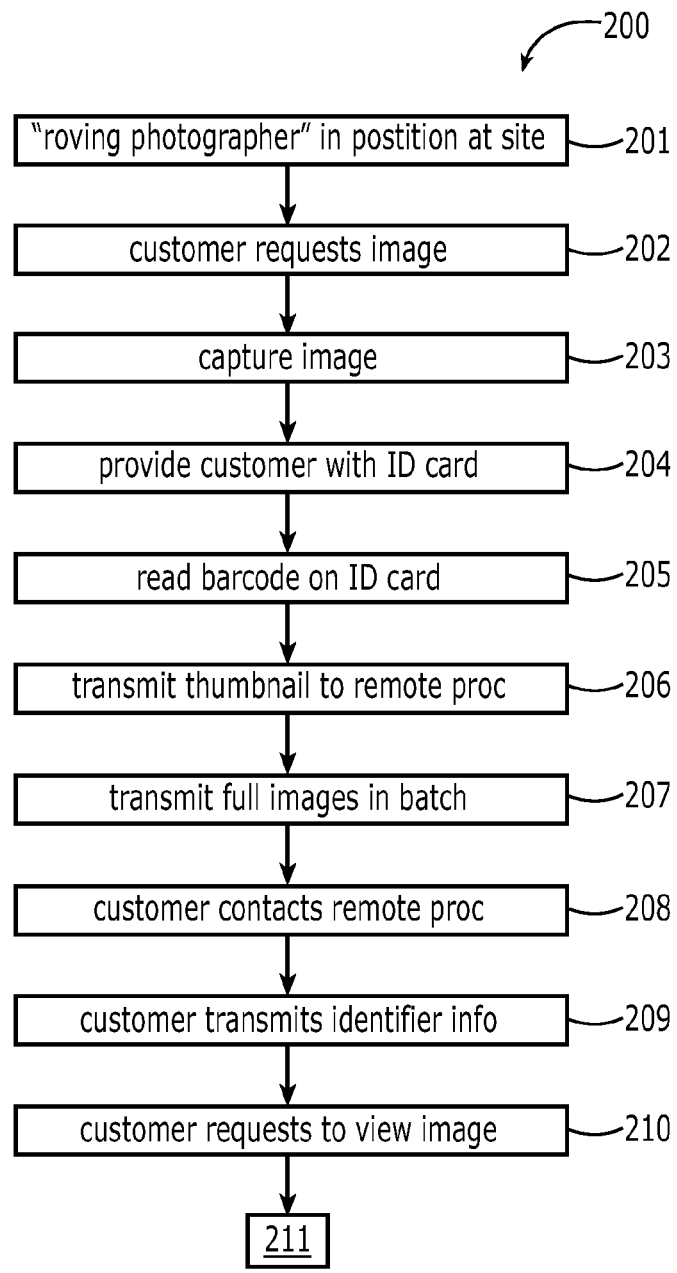
FIGS. 11A-B is a flowchart for another embodiment of the invention with a "roving" photographer.
Figure 11B:
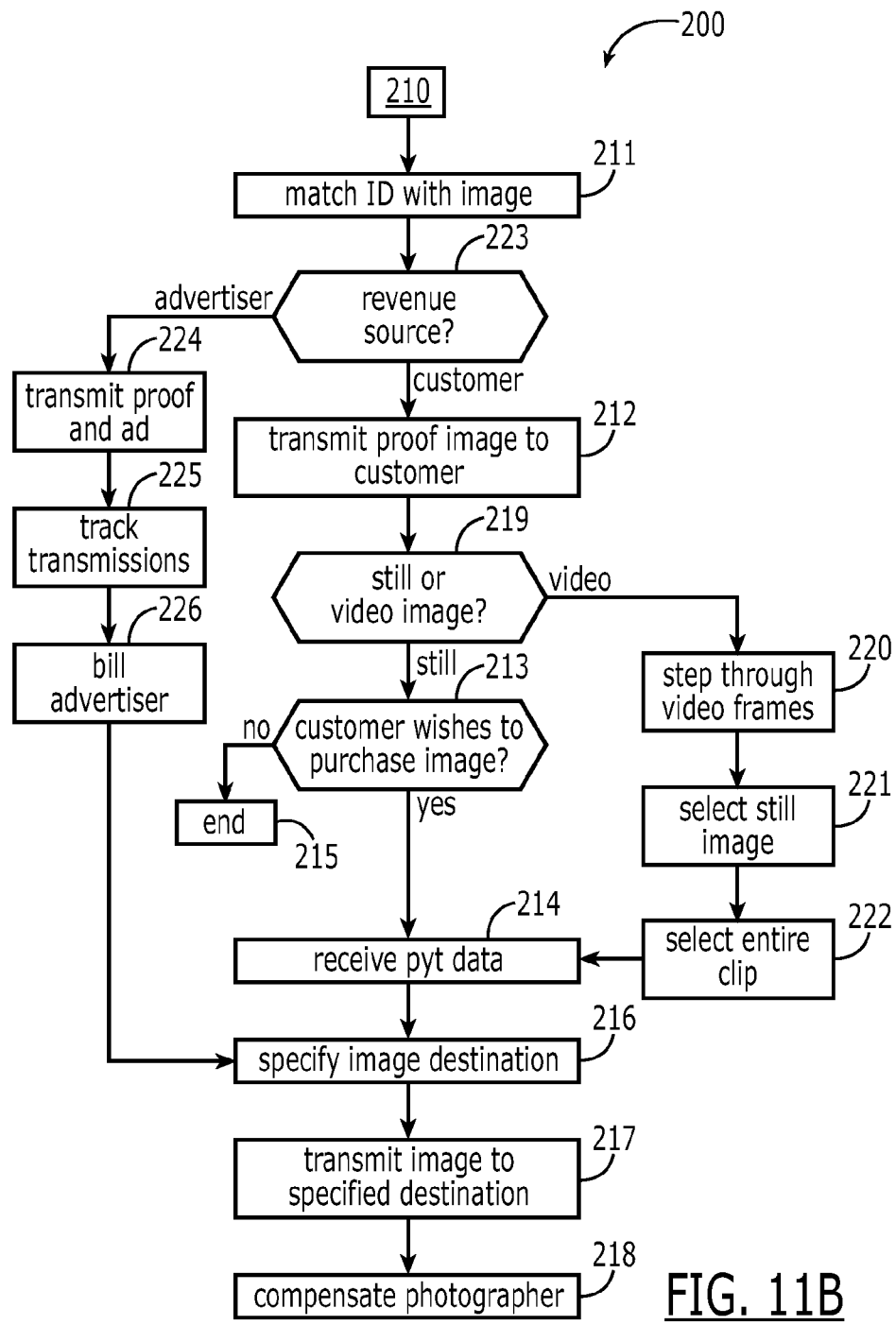
Figure 12:
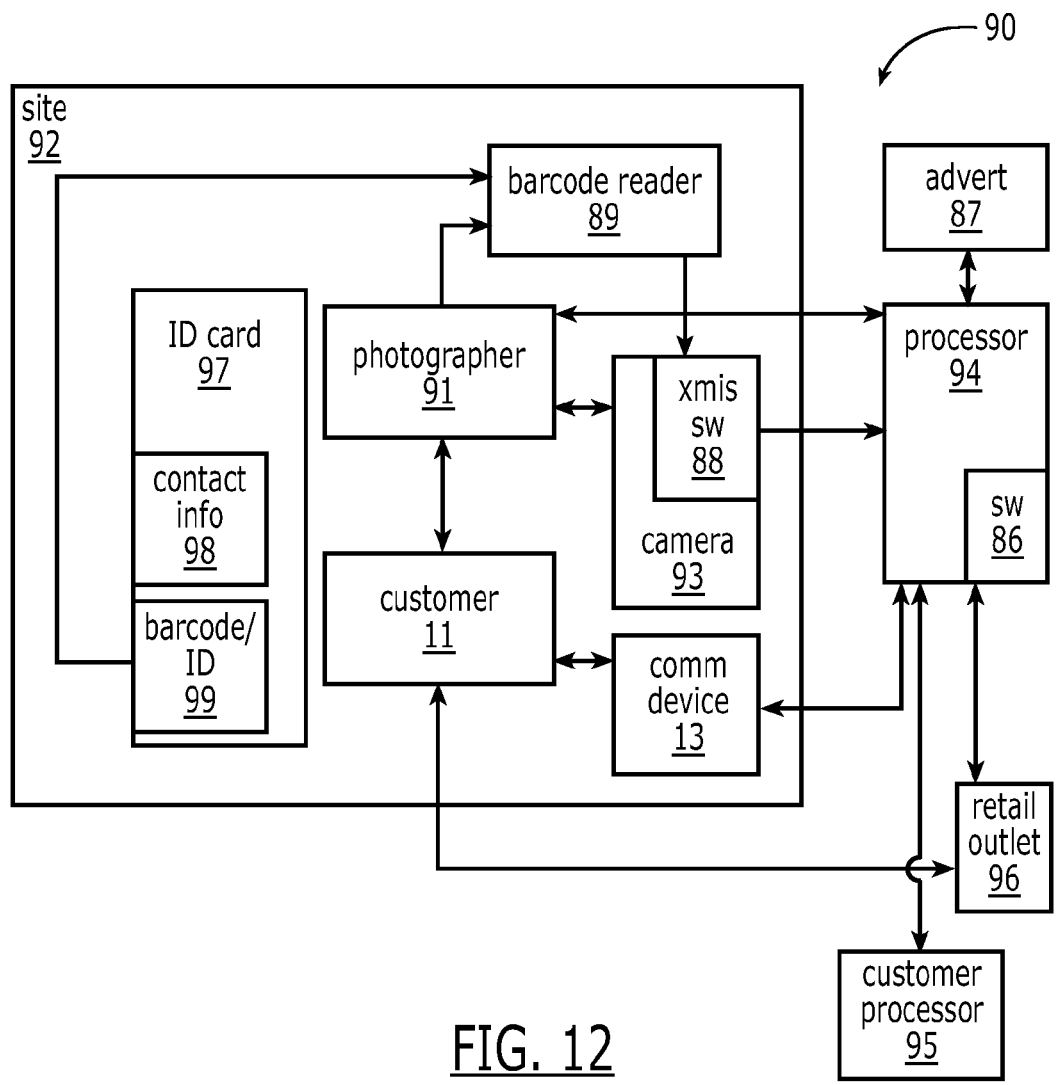
FIG. 12 is a system schematic for the method of FIG. 11.

In another embodiment of a method 200 for distributing a digital image of a customer a "roving" photographer 91 is again used at a site 92 (block 201; FIGS. 11 and 12). This embodiment 200 comprises the step of receiving a request from the customer 11 to the "roving" photographer 91 for an image to be taken of the customer 11 at the site 92 (block 202). Again, the "roving" photographer is equipped with a camera 93, which may comprise a digital still camera or a digital video camera or other digital imaging device, that is able to access a remote processor 94, such as over the Internet via WiFi or some other system. An image, or a plurality of images, of the customer 11 is captured at the site 92 in response to the received request (block 203). The image(s) can comprise, for example, a digital still image or a digital video image comprising a sequence of frames.

In a particular embodiment, the customer 11 is given a card 97 having thereon indicia such as contact information 98 for ordering and retrieving photographs, such as telephone number and/or website, and unique identifier information such as, but not intended to be limited to, a barcode 99 (block 204). Prior to giving the card 97 to the customer 11, the photographer will use an identifier detector, such as a barcode reader 89, to swipe the card's barcode 99 into the camera. One of skill in the art will recognize that a plurality of identifier means could be used in the system 90, such as radio frequency identification or other means known in the art.

In an alternate embodiment, the system 90 could include a subscription option, wherein the customer 11 can become a member of the imaging organization, with membership privileges. Membership privileges could include, for example, some or an unlimited number of images for a predetermined time period, some or an unlimited number of images at a predetermined location, some other permutation thereof. In this case, the customer 11 could be provided with a "permanent" card 97 with his/her unique identifier information. Further, a subscriber could use an associated website to automatically send images to a group of friends or family, to automatically route images for printing to a specified location, or any other preference known in the art.

Once the photographer 91 has completed the image-capture process, the barcode reader 89 (block 205) triggers via, for example, embedded software 88, the imaging device 93 to transmit the image(s) and the identifier data via a network 87 such as the Internet to a remote processor 94 under control of the imaging organization.

In a particular embodiment, the image(s) can be uploaded in two steps: First, a limited-data-set version of the image (a "thumbnail") is transmitted (block 206), since this process can occur quickly. Then, the full-data-set image is transmitted in a batch (block 207), which will typically take longer, and may require queuing.

Then the customer 11, using the contact information 98, contacts the remote processor 94 having software 86 resident thereon for mediating the following transactions (block 208) and transmits the identifier information 99 (block 209). The identifier information 99 can be transmitted via a telephone keypad, for example, or via barcode recognition on a telephone equipped with a camera. Alternatively, facial recognition software could be used to automatically identify the customer 11. The customer 11 makes a request to view the image(s) (block 210), the identifier information 99 is matched to the image(s) (block 211), and a proof image is transmitted from the remote processor 94 to a customer device 13 (block 212), which, as above, can include a cell phone, a computer, or any type of web-connectable device. Preferably the image cannot be retained by the customer 11 at this point, nor can the customer 11 transfer the image in any way, and it will disappear after a predetermined amount of time.

If the customer decides to purchase the image (block 213), a transaction is finalized by receiving payment data from the customer 11 (block 214); if the customer does not desire to purchase the image (block 213), the process terminates (block 215). If the image is purchased, and payment is validated, the customer 11 can indicate where the final image should be sent (block 216). Exemplary customer selections can include, for example, the customer's own device, such as the mobile device 13 or a home computer 95. The system 10 will automatically size the image commensurate with the device to which the image is being sent. If the customer 11 is a member, for example, a default customer preference may dictate that the image always be sent to a predetermined location. Alternatively, the image can be sent to a commercial outlet 96 that is equipped to print or otherwise make an electronic copy of the image for subsequent pick-up by the customer 11. This option can be attractive, for example, during travel. Once the customer selection is made, the final image is transmitted to the desired location (block 217).

As discussed above, an option to request a complete album can be provided, wherein the customer's own images can be formatted into a unified whole, with or without the addition of library images, for example, of the location at which the images have been taken.

The photographer 91 can receive compensation as a commission on sales, for example. When the image is uploaded with the identifier data, those data are associated with the photographer 91. Then, when the customer 11 makes payment, the photographer's commission can be credited to his/her account for immediate or subsequent disbursal via means known in the art (block 218).

As discussed above, the image can comprise a digital still or video image (block 219). If the image is a video clip, the proof comprises at least a portion of the video clip, and the customer 11 can step through the video clip frame by frame (block 220) to select one or more still images therefrom (block 221), and/or he/she may elect to purchase the entire video clip (block 222).

In a subembodiment of this system 90, rather than, or in addition to, soliciting payment from the customer 11 for a final image (block 223), revenue is generated at least in part by advertising. Here, along with the proof image, an advertisement in the form of a still image and/or a video clip is sent to the customer communication device 13 (block 224). Payment can be received from the advertiser 87 by, for example, tracking the number of times the advertisement is transmitted (block 225), and billing the advertiser at a predetermined rate therefor (block 226).

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A method for distributing a digital image of a customer comprising the steps of:
   receiving a request from a customer to a human representative for an image to be taken of the customer at a site;
   capturing an image of the customer at the site in response to the received request;
   transmitting the image to a remote processor;
   receiving an electronic request from the customer to view the transmitted image;
   transmitting the image and an advertisement from the remote processor to a customer communication device;
   receiving compensation from a sponsor of the advertisement; and
   if the customer decides to keep the image, providing the image to the customer and compensating the human representative for the transaction.

2. The digital image distribution method recited in claim 1, further comprising the step, following the image-request-receiving step, of providing the customer with an identifier code, and wherein:
   the step of transmitting the image to the remote processor comprises transmitting the image and the identifier code to the remote processor; and
   the electronic-request-receiving step includes receiving the identifier code from the customer and matching the image with the identifier code.

3. The digital image distribution method recited in claim 2, wherein the identifier-code-providing step comprises providing the customer with an indicia-bearing element including the identifier code and information on how to request to view the image from the remote processor.

4. The digital image distribution method recited in claim 3, wherein the indicia-bearing element comprises a card having imprinted thereon a barcode identifier, and wherein the identifier-code-transmitting step comprises reading the bar code electronically and transmitting the electronically read barcode to the remote processor.

5. The digital image distribution method recited in claim 2, wherein the identifier code is associated with the human representative, and further comprising the step, prior to the compensating step, of matching the identifier code with the human representative.

6. The digital image distribution method recited in claim 1, wherein the image-capturing step comprises capturing a plurality of images, and wherein the step of transmitting the image to a remote processor comprises transmitting the plurality of images to the remote processor in a batch.

7. The digital image distribution method recited in claim 1, wherein the step of transmitting the image to a remote processor comprises transmitting a first image comprising a reduced-data-size image to the remote processor first, and then queuing a second image comprising a full-data image for subsequent transmittal to the remote processor.

8. The digital image distribution method recited in claim 1, wherein the step of transmitting the image to the customer communication device comprises transmitting a proof image to a mobile personal communication device.

9. The digital image distribution method recited in claim 8, wherein the image-providing step comprises at least one of transmitting the image to a customer communication device and transmitting the image for printing to a commercial site for retrieval by the customer.

10. The digital image distribution method recited in claim 1, wherein:
the image-capturing step comprises capturing a high-definition video image of the customer;
the step of transmitting the image to the customer communication device comprises transmitting at least a portion of the video image; and further comprising the steps of:
permitting the customer to step through the video image portion frame by frame; and
permitting the customer to select one or more frame for purchase.

11. The digital image distribution method recited in claim 10, wherein the advertisement comprises a video clip.

12. The digital image distribution method recited in claim 10, further comprising the step of editing a pre-created video clip into the captured image, and wherein the image-providing step comprises providing the customer with a composite video image of the captured image and the pre-created video clip.

* * * * *